(12) United States Patent
Yan et al.

(10) Patent No.: US 11,466,212 B2
(45) Date of Patent: *Oct. 11, 2022

(54) LIQUID CRYSTAL COMPOSITION AND PHOTOELECTRIC DISPLAY DEVICE THEREOF

(71) Applicant: Jiangsu Hecheng Display Technology Co., Ltd., Yangzhong (CN)

(72) Inventors: Weigang Yan, Yangzhong (CN); Wenyang Ma, Yangzhong (CN); Wenming Han, Yangzhong (CN)

(73) Assignee: Jiangsu Hecheng Display Technology Co., Ltd., Yangzhong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/998,487

(22) Filed: Aug. 20, 2020

(65) Prior Publication Data

US 2021/0095208 A1 Apr. 1, 2021

(30) Foreign Application Priority Data

Sep. 30, 2019 (CN) .......................... 201910944321.X

(51) Int. Cl.
C09K 19/30 (2006.01)
C09K 19/04 (2006.01)

(52) U.S. Cl.
CPC .. C09K 19/3066 (2013.01); *C09K 2019/0448* (2013.01)

(58) Field of Classification Search
CPC .............................................. C09K 2019/3027
See application file for complete search history.

(56) References Cited

U.S. PATENT DOCUMENTS

| | | | | |
|---|---|---|---|---|
| 2012/0181478 A1* | 7/2012 | Hattori | ................... | C09K 19/44 252/299.61 |
| 2016/0319191 A1* | 11/2016 | Hirata | ................ | C09K 19/0216 |
| 2016/0325231 A1* | 11/2016 | Kaetzel | ................ | C09K 19/00 |

FOREIGN PATENT DOCUMENTS

| | | | |
|---|---|---|---|
| CN | 112368636 A | | 2/2021 |
| JP | 2012097222 A | * | 5/2012 |
| JP | 6414723 B2 | | 10/2018 |
| WO | 2017/221724 A1 | † | 12/2017 |
| WO | 2017/221725 A1 | | 12/2017 |
| WO | WO-2017221724 A1 | * | 12/2017 ............. C09K 19/12 |

OTHER PUBLICATIONS

Translation of JP 201209722 (Year: 2021).*

* cited by examiner
† cited by third party

*Primary Examiner* — Chanceity N Robinson
(74) *Attorney, Agent, or Firm* — Hoffmann & Baron, LLP

(57) ABSTRACT

A liquid crystal composition includes one or more compounds of general Formula I in an amount of 1%-30% by weight of the total weight of the liquid crystal composition, one or more compounds of general Formula II in an amount of 5%-35% by weight of the total weight of the liquid crystal composition, and one or more compounds of general Formula III in an amount of 1%-35% by weight of the total weight of the liquid crystal composition. The liquid crystal composition has an appropriate clearing point, an appropriate optical anisotropy, an appropriate dielectric anisotropy, as well as a higher voltage holding ratio, a higher transmittance, a good high-temperature resistant performance and a faster response speed, thus being suitable for display modes, such as VA, IPS and FFS. A photoelectric display device includes the liquid crystal composition.

11 Claims, No Drawings

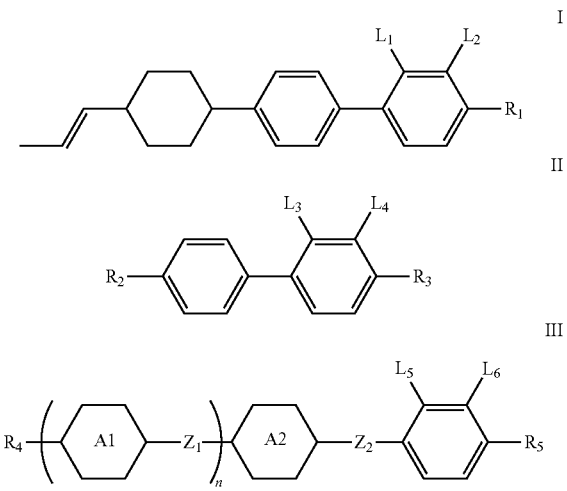

LIQUID CRYSTAL COMPOSITION AND PHOTOELECTRIC DISPLAY DEVICE THEREOF

CROSS-REFERENCE TO RELATED APPLICATIONS

This application claims priority to and benefit of Chinese Patent Application No. 201910944321.X filed on Sep. 30, 2019. The contents of the above application are hereby expressly incorporated by reference in its entirety into the present application, including the contents and teachings of any references contained therein.

TECHNICAL FIELD

The present invention relates to the field of liquid crystal material, particularly to a liquid crystal composition and a photoelectric display device comprising the same.

BACKGROUND ARTS

Liquid crystal displays (LCDs) are used in many fields to display information, mainly for direct view displays, as well as for projection type displays. LCDs have gained rapid development due to their small size, light weight, low power consumption and excellent display quality, and in particular, have been widely used in portable electronic information products. With the increase in the size of liquid crystal screens for portable computers, office applications, and video applications, liquid crystal displays are being able to be used for large-screen displays and eventually to replace cathode ray tubes (CRTs).

The electro-optical mode which is employed for most displays still is the twisted nematic (TN)-mode with its various modifications. Besides this mode, the super twisted nematic (STN)-mode and more recently the optically compensated bend (OCB)-mode and the electrically controlled birefringence (ECB)-mode with their various modifications, e.g. the vertically aligned nematic (VAN)-mode, the patterned ITO vertically aligned nematic (PVA)-mode, the polymer stabilized vertically aligned nematic (PSVA)-mode and the multi-domain vertically aligned nematic (MVA)-mode, as well as others, have been increasingly used. All these modes use an electrical field, which is substantially perpendicular to the substrates, respectively to the liquid crystal layer. Besides these modes, there are also electro-optical modes employing an electrical field substantially parallel to the substrates, respectively to the liquid crystal layer, e.g., the In-Plane Switching (short IPS) mode and the Fringe Field Switching (FFS) mode. Especially the latter mentioned electro-optical modes, which have good viewing angle properties and improved response times, are increasingly used for LCDs for modern desktop monitors and even for displays for TV and for multimedia applications and thus are competing with the TN-LCDs.

Liquid crystal materials are widely used in liquid crystal displays (LCDs), especially electro-optic displays with active matrix or passive matrix addressing to display information. In the case of an active matrix display, a single pixel is usually addressed by integrated non-linear active elements, such as transistors, such as thin-film transistors (TFTs), while in the case of a passive matrix display, a single pixel is usually addressed by multiplexing methods known in the prior art.

Liquid crystals are used, in particular as dielectrics in display devices, since the optical properties of such substances can be modified by an applied voltage Therefore, liquid-crystal materials must generally have good chemical and thermal stability and good stability to electric fields and electromagnetic radiation.

Compared with traditional display devices and display materials, liquid crystal display materials have obvious advantages: low driving voltage, small power consumption, high reliability, large amount of display information, color display, no flicker, no harm to human body, production process automation, low cost, etc. Because of these advantages, liquid crystal display technology has a profound impact on the field of display imaging, and promotes the development of microelectronic technology and optoelectronic information technology. With its good optical performance and photoelectric effect, liquid crystal materials have been widely used to display information in many occasions, such as portable computers, office applications, video applications, etc.

At present, the liquid crystal used for LCD is developing in the direction of faster response speed and better reliability, and the high-speed response characteristic of the liquid crystal composition comes from the corresponding physical parameters (such as rotational viscosity and elastic constant) of its components. While satisfying the faster response speed, some properties such as low-temperature stability and reliability must not be compromised. However, the existing technology still fails to effectively solve this technical problem.

This means there is a need to further improve the liquid crystal material. From the perspective of the preparation of liquid crystal materials, the properties of liquid crystal materials are mutually constrained and influenced, and the improvement of a certain performance index may cause other properties to change. Therefore, the preparation of liquid crystal materials with suitable properties in all aspects often requires creative work.

SUMMARY OF THE INVENTION

In view of the defects of existing technologies, one objective of the present invention is to provide a liquid crystal composition having an appropriate clearing point, an appropriate optical anisotropy, an appropriate dielectric anisotropy, as well as a higher voltage holding ratio, a higher transmittance, a good high-temperature resistant performance and a faster response speed, thus being suitable for display modes, such as VA, IPS and FFS. Another objective of the present invention is to provide a photoelectric display device comprising the liquid crystal composition of the present invention.

In order to achieve the above objects, the present invention in one aspect provides a liquid crystal composition comprising:

one or more compounds of general Formula I in an amount of 1%-30% by weight of the total weight of the liquid crystal composition

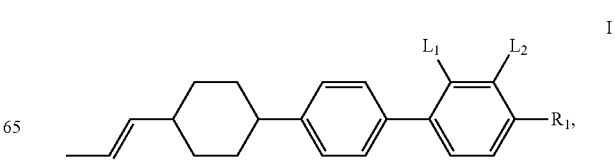

one or more compounds of general Formula II in an amount of 5%-35% by weight of the total weight of the liquid crystal composition

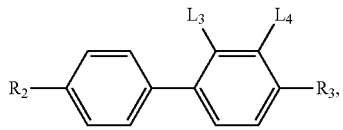

and
one or more compounds of general Formula III in an amount of 1%-35% by weight of the total weight of the liquid crystal composition

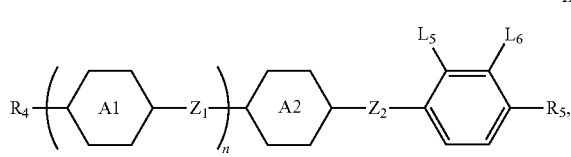

wherein, $R_1$, $R_3$ and $R_5$ each independently represents $C_{1-7}$ alkyl or alkoxy; $R_2$ and $R_4$ each independently represents $C_{1-7}$ alkyl or alkoxy, or $C_{2-7}$ alkenyl or alkenoxy; wherein one or more —H in $R_1$, $R_2$, $R_3$, $R_4$ and $R_5$ can each be independently substituted by halogen, and one or more —$CH_2$— in $R_1$, $R_2$, $R_3$, $R_4$ and $R_5$ can each be independently substituted by cyclopentyl, cyclopropyl or cyclobutyl;

$L_1$, $L_2$, $L_3$, $L_4$, $L_5$ and $L_6$ each independently represents —F, —Cl, —$CF_3$, —$OCF_3$ or —$CH_2F$;

$Z_1$ and $Z_2$ each independently represents single bond, —$CH_2CH_2$—, —COO—, —$CH_2O$— or —$CF_2O$—, and at least one of $Z_1$ and $Z_2$ is not single bond;

ring A1 and ring A2 each independently represents 1,4-cyclohexylene, 1,4-cyclohexenylene or 1,4-phenylene, wherein one or more —H on 1,4-phenylene may be substituted by halogen, and wherein one or more —$CH_2$— in 1,4-cyclohexylene may be replaced by —O—; and n represents 0 or 1.

In some embodiments of the present invention, $C_{1-7}$ alkyl may be a linear or branched alkyl group having 1, 2, 3, 4, 5, 6, or 7 carbon atoms.

In some embodiments of the present invention, $C_{1-7}$ alkoxy may be a linear or branched alkoxy group having 1, 2, 3, 4, 5, 6, or 7 carbon atoms.

In some embodiments of the present invention, $C_{2-7}$ alkenyl may be a linear or branched alkenyl group having 2, 3, 4, 5, 6, or 7 carbon atoms.

In some embodiments of the present invention, $C_{2-7}$ alkenoxy may be a linear or branched alkenoxy group having 2, 3, 4, 5, 6, or 7 carbon atoms.

In some embodiments of the present invention, the one or more compounds of general Formula I provides 5%-25% by weight of the total weight of the liquid crystal composition, the one or more compounds of general Formula II provides 8%-30% by weight of the total weight of the liquid crystal composition, and the one or more compounds of general Formula III provides 5%-30% by weight of the total weight of the liquid crystal composition.

In some embodiments of the present invention, the compound of general Formula I provides 5%, 8%, 10%, 12%, 15%, 18%, 20%, 22% or 24% by weight of the total weight of the liquid crystal composition, the compound of general Formula II provides 8%, 10%, 12%, 15%, 18%, 20%, 22%, 25%, 26% or 28% by weight of the total weight of the liquid crystal composition, and the compound of general Formula III provides 5%, 8%, 10%, 12%, 15%, 18%, 20%, 22%, 25%, 26% or 28% by weight of the total weight of the liquid crystal composition. The weight percentages of the compounds of general Formula I, general Formula II and general Formula III are not limited to the values listed above, and may be any other values within the above ranges.

In the preferred embodiments of the present invention, the one or more compounds of general Formula I provides 10%-25% by weight of the total weight of the liquid crystal composition, the one or more compounds of general Formula II provides 8%-26% by weight of the total weight of the liquid crystal composition, and the one or more compounds of general Formula III provides 5%-30% by weight of the total weight of the liquid crystal composition.

In the further preferred embodiments of the present invention, the one or more compounds of general Formula I provides 10%-25% by weight of the total weight of the liquid crystal composition, the one or more compounds of general Formula II provides 8%-20% by weight of the total weight of the liquid crystal composition, and the one or more compound of general Formula III provides 5%-28% by weight of the total weight of the liquid crystal composition.

In some embodiments of the present invention, the compound of general Formula I is selected from a group consisting of the following compounds:

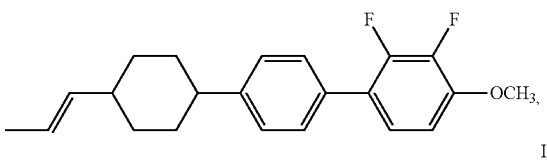

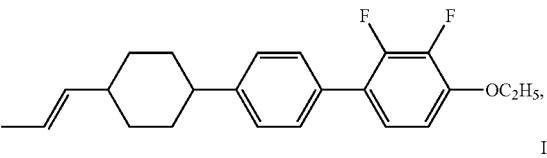

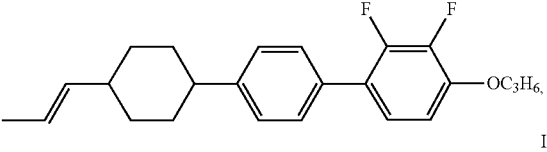

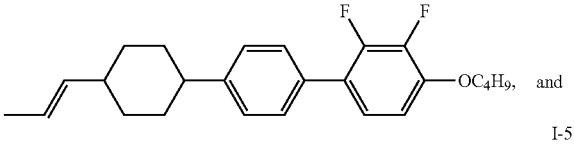

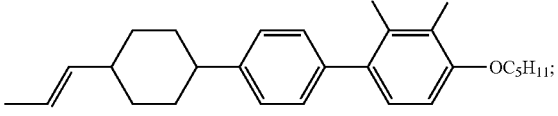

the compound of general Formula II is selected from a group consisting of the following compounds:

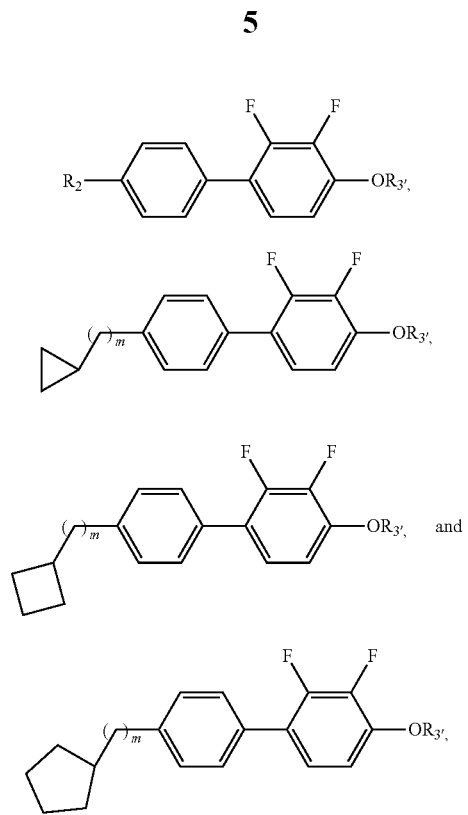
wherein, $R_2$ represents $C_{1-7}$ alkyl or alkoxy, or $C_{2-7}$ alkenyl, $R_3{}'$ represents $C_{1-7}$ alkyl, and m represents 0, 1 or 2; and
the compound of general Formula III is selected from a group consisting of the following compounds:
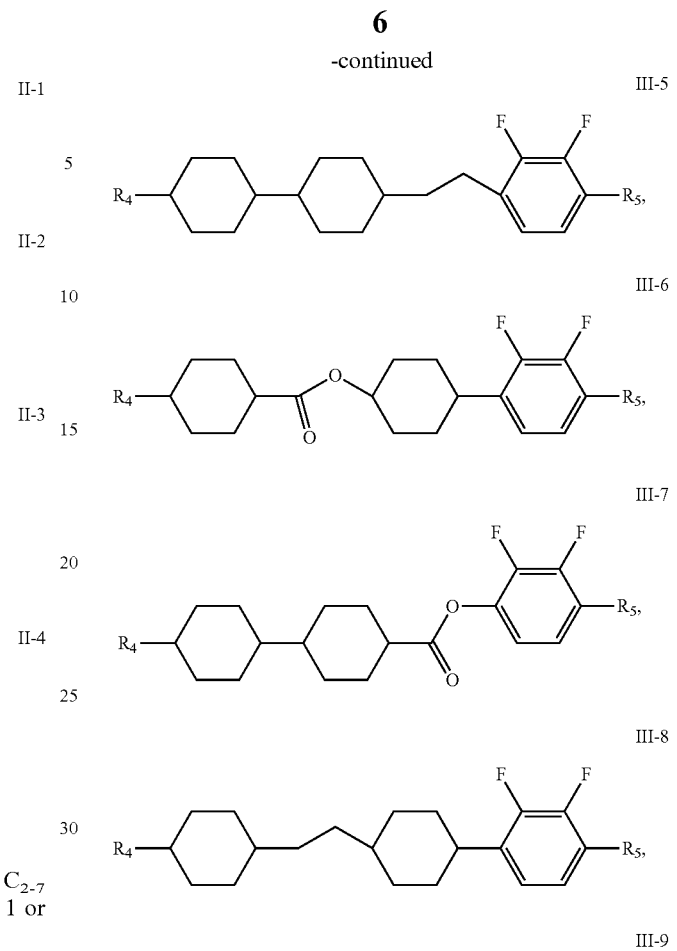
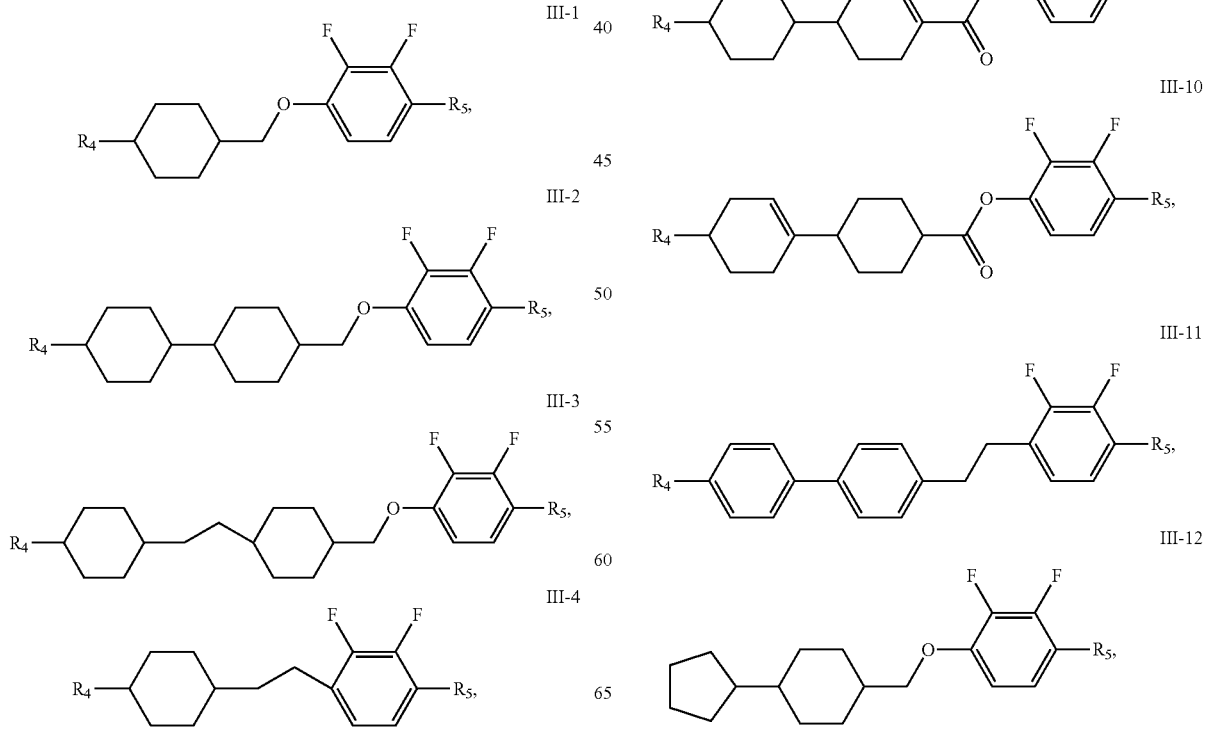

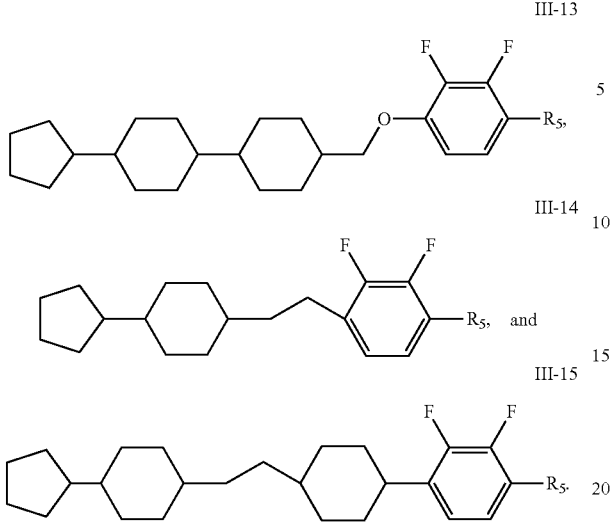

In some embodiments of the present invention, the liquid crystal composition further comprising:

one or more compounds of general Formula IV in an amount of 10%-70% by weight of the total weight of the liquid crystal composition

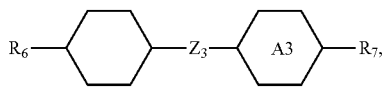

wherein, $R_6$ and $R_7$ each independently represents $C_{1-7}$ alkyl or alkoxy, or $C_{2-7}$ alkenyl;

$Z_3$ represents single bond, —$CH_2CH_2$—, —$CH$=$CH$— or —$CH_2O$—; and ring A3 represents 1,4-cyclohexylene, 1,4-cyclohexenylene or 1,4-phenylene.

In some embodiments, the compound of general Formula IV is in an amount of 20%-60%, such as 22%, 25%, 28%, 30%, 35%, 40%, 45%, 50%, 55% or 58%, by weight of the total weight of the liquid crystal composition. The weight percentage of the compounds of general Formula IV is not limited to the values listed above, and may be any other values within the above ranges.

In the preferred embodiments of the present invention, the compound of general Formula IV provides 20%-50% by weight of the total weight of the liquid crystal composition.

In the further preferred embodiments of the present invention, the compound of general Formula IV provides 28%-45% by weight of the total weight of the liquid crystal composition.

In some embodiments of the present invention, the compound of general Formula IV is selected from a group consisting of the following compounds:

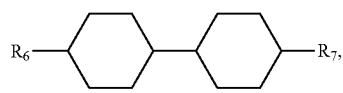

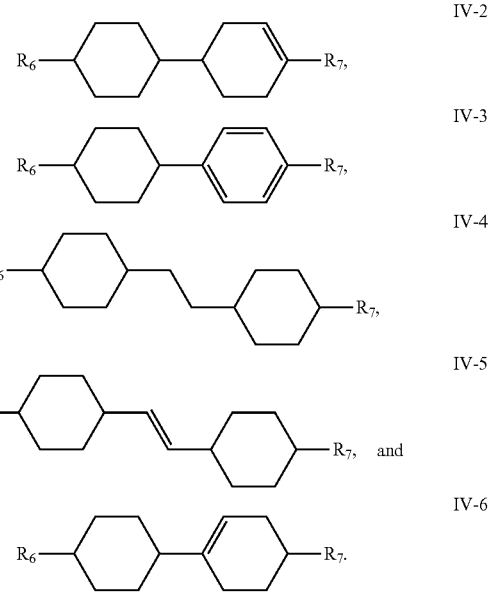

In some embodiments of the present invention, the liquid crystal composition further comprising:

one or more compounds of general Formula V in an amount of 0%-20% by weight of the total weight of the liquid crystal composition

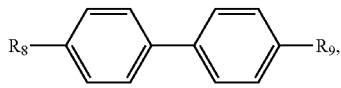

wherein, $R_8$ and $R_9$ each independently represents $C_{1-7}$ alkyl or alkoxy, or $C_{2-7}$ alkenyl.

In some embodiments of the present invention, the compound of general Formula V is in an amount of 0%-15%, such as 0%, 1%, 2%, 5%, 8%, 10%, 12% or 14%, by weight of the total weight of the liquid crystal composition. The weight percentage of the compound of general Formula V is not limited to the values listed above, and may be any other values within the above range.

In the preferred embodiments of the present invention, the compound of general Formula V provides 0%-10% by weight of the total weight of the liquid crystal composition.

In some embodiments of the present invention, at least one of $R_8$ and $R_9$ represents $C_{2-7}$ alkenyl.

In some embodiments of the present invention, the at least one compound of general Formula V is selected from a group consisting of the following compounds:

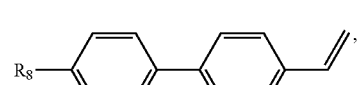

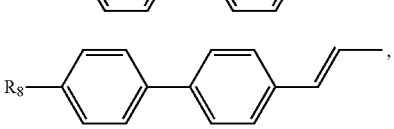

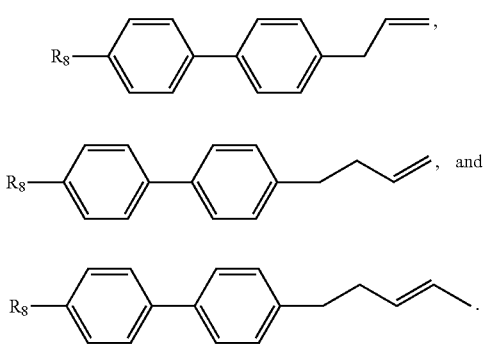

In another aspect, the present invention provides a photoelectric display device comprising the above liquid crystal composition.

Beneficial Effects

As compared with the prior art, the liquid crystal composition provided herein has an appropriate clearing point, an appropriate optical anisotropy, an appropriate dielectric anisotropy, as well as a higher voltage holding ratio, a higher transmittance, a good high-temperature resistant performance and a faster response speed, thus being suitable for display modes, such as VA, IPS and FFS.

DETAILED DESCRIPTION OF THE INVENTION

The present invention will be illustrated by combining the detailed embodiments below. It should be noted that, the following examples are exemplary embodiments of the present invention, which are only used to illustrate the present invention, not to limit it. Other combinations and various modifications within the conception of the present invention are possible without departing from the subject matter and scope of the present invention.

For the convenience of the expression, the group structures of the liquid crystal compounds in the following Examples are represented by the codes listed in Table 1:

TABLE 1

| Codes of the group structures of the liquid crystal compounds | | |
|---|---|---|
| Unit structure of group | Code | Name of the group |
| (cyclohexane ring) | C | 1,4-cyclohexylene |
| (benzene ring) | P | 1,4-phenylene |
| (cyclohexene ring) | L | 1,4-cyclohexenylene |
| (difluorobenzene ring) | W | 2,3-difluoro-1,4-phenylene |
| —CH$_2$CH$_2$— | 2 | ethyl bridge bond |
| —CF$_3$ | CF3 | trifluoromethyl |
| —OCF$_3$ | OCF3 | trifluoromethoxy |
| —CH$_2$F | CH2F | monofluoromethyl |
| —F | F | fluoro substituent |
| —O— | O | oxygen substituent |
| —CF$_2$O— | Q | difluoromethoxy |
| —CH$_2$O— | 1O | methyleneoxy |
| —COO— | E | ester bridge bond |
| —C$_n$H$_{2n+1}$ | n (n represents a positive integer of 1-7) | alkyl |
| —CH=CH— or —CH=CH$_2$ | V | ethenyl |

Take the compound with the following structural formula as an example:

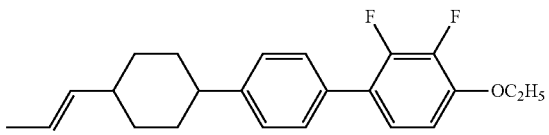

Represented by the codes listed in Table 1, this structural formula can be expressed as 1VCPWO2, in which, "1" in the code represents that the group on the left is —CH$_3$; "2" in the code represents the group on the right is —C$_2$H$_5$; "V" in the code represents —CH=CH—, "C" in the code represents 1,4-cyclohexylene; "P" in the code represents 1,4-phenylene; "W" in the code represents 2,3-difluoro-1,4-phenylene; and "O" in the code represents —O—.

The abbreviated codes of the test items in the following Examples are represented as follows:

Δn optical anisotropy (589 nm, 25° C.)
Δε dielectric anisotropy (1 KHz, 25° C.)
Cp clearing point (nematic-isotropic phases transition temperature, ° C.)
γ1 rotational viscosity (mPa*s, at 25° C.)
V$_{90}$ saturation voltage (characteristic voltage with 90% relative transmittance)
τ$_{off}$ the time required to reduce the transmittance from 90% to 10% when removing the electric field (ms, 25° C.)
T Transmittance (%, DMS 505 tester, cell gap 3.5 μm)
VHR voltage holding ratio (%)
I$_{on}$ (initial) initial ion concentration (pC/cm$^2$, 60° C.)
I$_{on}$ (high temperature) high-temperature ion concentration (pC/cm$^2$, 150° C.)
ΔI$_{on}$ difference in ion concentration (pC/cm$^2$)
in which, Cp is tested and obtained with melting point quantitative analysis;

Δn is tested and obtained with an Abbe refractometer under sodium lamp (589 nm) light source at 25° C.; Δε=ε$_{//}$−ε$_⊥$, in which, ε$_{//}$ is the dielectric constant parallel to the molecular axis, ε$_⊥$ is the dielectric constant perpendicular to the molecular axis, with the test conditions: 25±0.5° C., 1 kHz, VA type test cell with a cell gap of 6 μm;

γ1 is tested and obtained using INSTEC:ALCTIR1 at 25±0.5° C. with a parallel test cell having a cell gap of 20 km;

$V_{90}$ is tested and obtained with a DMS505 tester under the test conditions: 25° C., square wave/60 HZ, test voltage: 0-10 V;

$\tau_{off}$ is the time required to reduce the transmittance from 90% to 10% when removing the electric field and is measured with a VA type test cell having a cell gap of 3.5 m;

T of the optic-tunable device is measured at the temperature of 25° C. with a DMS505 tester under the test conditions: square wave/60 HZ, test voltage: 4V, VA type test cell having a cell gap of 3.5 m;

VHR is tested and obtained using a TOYO 6254 liquid crystal physical property evaluation system; the test voltage: 5 V, 6 Hz, VA type test cell with a cell gap of 9 m;

$I_{on}$ (initial) is tested and obtained using a TOYO 6254 liquid crystal physical property evaluation system under the test conditions: 10 V, 0.01 HZ, 60° C., VA type test cell with a cell gap of 9 μm; $I_{on}$ (initial) is tested and obtained by placing the VA type test cell at a constant temperature of 150° C. for 1 hour after the $I_{on}$ (initial) is tested and obtained; and $\Delta I_{on} = I_{on}$ (high temperature) $- I_{on}$ (initial).

The components used in the following Examples can either be synthesized by method known in the art or be obtained commercially. The synthetic techniques are conventional, and each of the obtained liquid crystal compounds is tested to meet the standards of electronic compound.

The liquid crystal compositions are prepared in accordance with the ratios specified in the following Examples through conventional methods in the art, such as heating, ultrasonic wave, or suspension.

The liquid crystal compositions of following Examples are prepared and then tested. The components and test results for the performances of the liquid crystal composition of each Example are shown below.

Comparative Example 1

The liquid crystal composition of Comparative Example 1 is prepared according to each compound and weight percentage listed in Table 2 and then tested for performance by filling the same between two substrates of a liquid crystal display device.

TABLE 2

Formulation of the liquid crystal composition and its test performances

| Code of component | Weight percentage | Test results for the performance parameters | |
|---|---|---|---|
| 2CC1OWO2 | 9 | Cp | 79.2 |
| 3CC1OWO2 | 10 | Δn | 0.1081 |
| 5CC1OWO2 | 7 | Δε | −4.2 |
| 3CCV | 35.5 | VHR | 80% |
| VCPWO2 | 10 | γ1 | 79 |
| 2PP2V1 | 2 | $V_{90}$ | 3.854 |
| VCPWO4 | 4 | $\tau_{off}$ | 4.95 |
| 1PWO2 | 11 | T | 25.98% |
| 2PWO2 | 7.5 | $I_{on}$ (initial) | 4269 |
| VCPWO3 | 4 | $I_{on}$ (high temperature) | 7028 |
| Total | 100 | $\Delta I_{on}$ | 2759 |

Comparative Example 2

The liquid crystal composition of Comparative Example 2 is prepared according to each compound and weight percentage listed in Table 3 and then tested for performance by filling the same between two substrates of a liquid crystal display device.

TABLE 3

Formulation of the liquid crystal composition and its test performances

| Code of component | Weight percentage | Test results for the performance parameters | |
|---|---|---|---|
| 2CC1OWO2 | 9 | Cp | 79.2 |
| 3CC1OWO2 | 10 | Δn | 0.1095 |
| 5CC1OWO2 | 7 | Δε | −4 |
| 3CCV | 26.5 | VHR | 78% |
| 1VCPWO2 | 10 | γ1 | 95 |
| 2PP2V1 | 8 | $V_{90}$ | 3.911 |
| VCPWO4 | 4 | $\tau_{off}$ | 5.12 |
| 1CWO2 | 11 | T | 25.90% |
| 2CWO2 | 7.5 | $I_{on}$ (initial) | 4312 |
| VCPWO3 | 4 | $I_{on}$ (high temperature) | 7244 |
| 3CPWO2 | 3 | $\Delta I_{on}$ | 2932 |
| Total | 100 | | |

Example 1

The liquid crystal composition of Example 1 is prepared according to each compound and weight percentage listed in Table 4 and then tested for performance by filling the same between two substrates of a liquid crystal display device.

TABLE 4

Formulation of the liquid crystal composition and its test performances

| Code of component | Weight percentage | Test results for the performance parameters | |
|---|---|---|---|
| 2CC1OWO2 | 5 | Cp | 78.5 |
| 3CC1OWO2 | 14 | Δn | 0.1078 |
| 5CCWO2 | 7 | Δε | −3.9 |
| 3CCV | 2 | VHR | 83% |
| 1VCPWO2 | 7 | γ1 | 105 |
| 2PP2V1 | 2 | $V_{90}$ | 4.012 |
| 1CPWO4 | 5 | $\tau_{off}$ | 5.25 |
| 1PWO2 | 7 | T | 25.87% |
| 2PWO2 | 5 | $I_{on}$ (initial) | 4021 |
| 1CPWO3 | 7 | $I_{on}$ (high temperature) | 6471 |
| 3CC2 | 24 | $\Delta I_{on}$ | 2450 |
| 4CC3 | 10 | | |
| 3P2PWO2 | 5 | | |
| Total | 100 | | |

Example 2

The liquid crystal composition of Example 2 is prepared according to each compound and weight percentage listed in Table 5 and then tested for performance by filling the same between two substrates of a liquid crystal display device.

TABLE 5

Formulation of the liquid crystal composition and its test performances

| Code of component | Weight percentage | Test results for the performance parameters | |
|---|---|---|---|
| 2CC1OWO2 | 10 | Cp | 79.3 |
| 3CC1OWO2 | 10.5 | $\Delta n$ | 0.1091 |
| 5CC1OWO2 | 10 | $\Delta \varepsilon$ | −4 |
| 3CCV | 20 | VHR | 84% |
| 1VCPWO2 | 9 | $\gamma 1$ | 102 |
| 2PP2V1 | 7.5 | $V_{90}$ | 3.986 |
| 1VCPWO4 | 2 | $\tau_{off}$ | 5.18 |
| 3PWO2 | 8 | T | 25.89% |
| 1VCC2WO3 | 8 | $I_{on}$ (initial) | 3921 |
| 3CC2 | 10 | $I_{on}$ (high temperature) | 6361 |
| 1PP2V | 5 | $\Delta I_{on}$ | 2440 |
| Total | 100 | | |

Example 3

The liquid crystal composition of Example 3 is prepared according to each compound and weight percentage listed in Table 6 and then tested for performance by filling the same between two substrates of a liquid crystal display device.

TABLE 6

Formulation of the liquid crystal composition and its test performances

| Code of component | Weight percentage | Test results for the performance parameters | |
|---|---|---|---|
| 2CC1OWO2 | 9 | Cp | 78 |
| 3CC1OWO2 | 10 | $\Delta n$ | 0.108 |
| 5CC1OWO2 | 9 | $\Delta \varepsilon$ | −4.2 |
| 4CCV | 20 | VHR | 85% |
| 1VCPWO2 | 10 | $\gamma 1$ | 96 |
| 2PP2V1 | 7.5 | $V_{90}$ | 3.901 |
| 1VCPWO4 | 2 | $\tau_{off}$ | 5.11 |
| 3PWO2 | 13 | T | 25.95% |
| 1VCC2WO3 | 9 | $I_{on}$ (initial) | 3954 |
| 3CC2 | 10.5 | $I_{on}$ (high temperature) | 6298 |
| Total | 100 | $\Delta I_{on}$ | 2344 |

Example 4

The liquid crystal composition of Example 4 is prepared according to each compound and weight percentage listed in Table 7 and then tested for performance by filling the same between two substrates of a liquid crystal display device.

TABLE 7

Formulation of the liquid crystal composition and its test performances

| Code of component | Weight percentage | Test results for the performance parameters | |
|---|---|---|---|
| 2CC1OWO2 | 9 | Cp | 80 |
| 3C2C1OWO2 | 10 | $\Delta n$ | 0.109 |
| 5CC1OWO2 | 8 | $\Delta \varepsilon$ | −4.2 |
| 5CCV | 25.5 | VHR | 90% |
| 1VCPWO2 | 15 | $\gamma 1$ | 89 |
| 2PP2V1 | 2 | $V_{90}$ | 3.852 |
| 3C2WO1 | 1.5 | $\tau_{off}$ | 4.98 |

TABLE 7-continued

Formulation of the liquid crystal composition and its test performances

| Code of component | Weight percentage | Test results for the performance parameters | |
|---|---|---|---|
| 3PWO2 | 11 | T | 26.02% |
| 5PWO2 | 5 | $I_{on}$ (initial) | 3897 |
| 1CC2WO3 | 1 | $I_{on}$ (high temperature) | 5447 |
| 1PP2WO2 | 1 | $\Delta I_{on}$ | 1850 |
| 5CC3 | 9 | | |
| 3C2CV1 | 2 | | |
| Total | 100 | | |

Example 5

The liquid crystal composition of Example 5 is prepared according to each compound and weight percentage listed in Table 8 and then tested for performance by filling the same between two substrates of a liquid crystal display device.

TABLE 8

Formulation of the liquid crystal composition and the its performances

| Code of component | Weight percentage | Test results for the performance parameters | |
|---|---|---|---|
| 2CC1OWO2 | 9 | Cp | 79.2 |
| 3CC1OWO2 | 10 | $\Delta n$ | 0.1088 |
| 5CC1OWO2 | 7 | $\Delta \varepsilon$ | −4.2 |
| 3CCV | 35.5 | VHR | 93% |
| 1VCPWO2 | 10 | $\gamma 1$ | 80 |
| 2PP2V1 | 2 | $V_{90}$ | 3.806 |
| 1VCPWO4 | 4 | $\tau_{off}$ | 4.92 |
| 1PWO2 | 11 | T | 26.11% |
| 2PWO2 | 7.5 | $I_{on}$ (initial) | 3859 |
| 1VCPWO3 | 4 | $I_{on}$ (high temperature) | 5459 |
| Total | 100 | $\Delta I_{on}$ | 1600 |

Example 6

The liquid crystal composition of Example 6 is prepared according to each compound and weight percentage listed in Table 9 and then tested for performance by filling the same between two substrates of a liquid crystal display device.

TABLE 9

Formulation of the liquid crystal composition and its test performances

| Code of component | Weight percentage | Test results for the performance parameters | |
|---|---|---|---|
| 1VCC1OWO2 | 9 | Cp | 80.5 |
| 3CC1OWO2 | 9 | $\Delta n$ | 0.1102 |
| 3CC2 | 8 | $\Delta \varepsilon$ | −4.3 |
| 5CC1OWO2 | 6 | VHR | 94% |
| 3CCV | 28 | $\gamma 1$ | 76 |
| 1VCPWO2 | 11 | $V_{90}$ | 3.801 |
| 1V2PWO2 | 6 | $\tau_{off}$ | 4.86 |
| 1VCPWO4 | 4 | T | 26.16% |
| 1PWO2 | 9 | $I_{on}$ (initial) | 3869 |

TABLE 9-continued

Formulation of the liquid crystal composition and its test performances

| Code of component | Weight percentage | Test results for the performance parameters | |
|---|---|---|---|
| V2PWO2 | 6 | $I_{on}$ (high temperature) | 5384 |
| 1VCPWO3 | 4 | $\Delta I_{on}$ | 1515 |
| Total | 100 | | |

Example 7

The liquid crystal composition of Example 7 is prepared according to each compound and weight percentage listed in Table 10 and then tested for performance by filling the same between two substrates of a liquid crystal display device.

TABLE 10

Formulation of the liquid crystal composition and its test performances

| Code of component | Weight percentage | Test results for the performance parameters | |
|---|---|---|---|
| 2CC1OWO2 | 9 | Cp | 79 |
| 1VCC1OWO3 | 9 | Δn | 0.1102 |
| 3CC2 | 6 | Δε | −4.2 |
| 5CC1OWO2 | 3 | VHR | 97% |
| 3CCV | 30 | γ1 | 72 |
| 1VCPWO2 | 13 | V90 | 3.797 |
| 1V2PWO2 | 6 | $\tau_{off}$ | 4.81 |
| 1VCPWO4 | 4 | T | 26.2% |
| 1PWO2 | 9 | $I_{on}$ (initial) | 3801 |
| 2PWO2 | 7 | $I_{on}$ (high temperature) | 5041 |
| 1VCPWO3 | 4 | $\Delta I_{on}$ | 1240 |
| Total | 100 | | |

Example 8

The liquid crystal composition of Example 8 is prepared according to each compound and weight percentage listed in Table 11 and then tested for performance by filling the same between two substrates of a liquid crystal display device.

TABLE 11

Formulation of the liquid crystal composition and its test performances

| Code of component | Weight percentage | Test results for the performance parameters | |
|---|---|---|---|
| 1VCC1OWO2 | 7 | Cp | 73 |
| 3CC1OWO2 | 9 | Δn | 0.111 |
| 5C2C1OWO2 | 1 | Δε | −4.1 |
| 3CCV | 36 | VHR | 98% |
| 1VCPWO2 | 12 | γ1 | 63 |
| 1VCPWO4 | 6 | $V_{90}$ | 3.795 |
| 1PWO2 | 9 | $\tau_{off}$ | 4.74 |
| 2PWO2 | 9 | T | 26.26% |
| 1VCPWO3 | 6 | $I_{on}$ (initial) | 3754 |
| 3PWO2 | 5 | $I_{on}$ (high temperature) | 4904 |
| Total | 100 | $\Delta I_{on}$ | 1150 |

Based on the above Examples 1-8, it is indicated that the liquid crystal composition provided herein has an appropriate clearing point, an appropriate optical anisotropy, an appropriate dielectric anisotropy, as well as a higher voltage holding ratio, a higher transmittance, a lower initial ion concentration and a small difference in ion concentration (i.e., a good high-temperature resistant performance). In particular, when the contents of the compounds of general Formula I and general Formula II are increased, the above performance advantages are more obvious, and the rotational viscosity of the liquid crystal composition is also significantly reduced, thereby obtaining a faster response speed. Such liquid crystal compositions are suitable for display modes, such as VA, IPS and FFS.

Further, it can be seen from the above Comparative Example 1 and Example 5 that the liquid crystal composition of Comparative Example 1 (which comprises compound with similar structure as the compound of general Formula I of the present invention rather than the compound of general Formula I) is significantly inferior to the liquid crystal composition of Example 5 in voltage holding ratio, high-temperature resistant performance, and transmittance. This indicates that the compound of general Formula I of the present invention has an important contribution to the overall performance of the liquid crystal composition.

Furthermore, as can be seen from the comparison between the above Comparative Example 2 and Examples 1-8, the liquid crystal composition without the compound of general Formula II of the present invention is significantly inferior to the liquid crystal compositions of Examples 1-8 of the present invention in voltage holding ratio, high-temperature resistant performance, and transmittance. This indicates that the compound of general Formula II of the present invention is also essential for maintaining voltage holding ratio, high-temperature resistant performance and transmittance of the liquid crystal composition of the present invention at high levels.

The above embodiments are merely illustrative of the technical concepts and the features of the present invention, are included merely for purposes of illustration and implement of the present invention, and are not intended to limit the scope of the present invention. Equivalent variations or modifications are intended to be included within the scope of the invention.

The invention claimed is:

1. A liquid crystal composition comprising:
   one or more compounds of general Formula I in an amount of 10%-25% by weight of the total weight of the liquid crystal composition

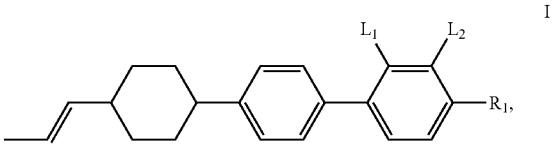

one or more compounds of general Formula II in an amount of 5%-35% by weight of the total weight of the liquid crystal composition

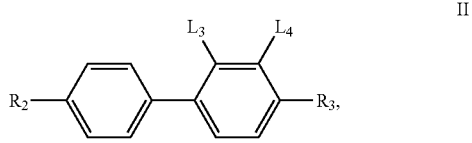

and
   one or more compounds selected from the group consisting of general Formulas III-3, III-6 to III-10, and III-12 to III-15 in an amount of 1%-35% by weight of the total weight of the liquid crystal composition

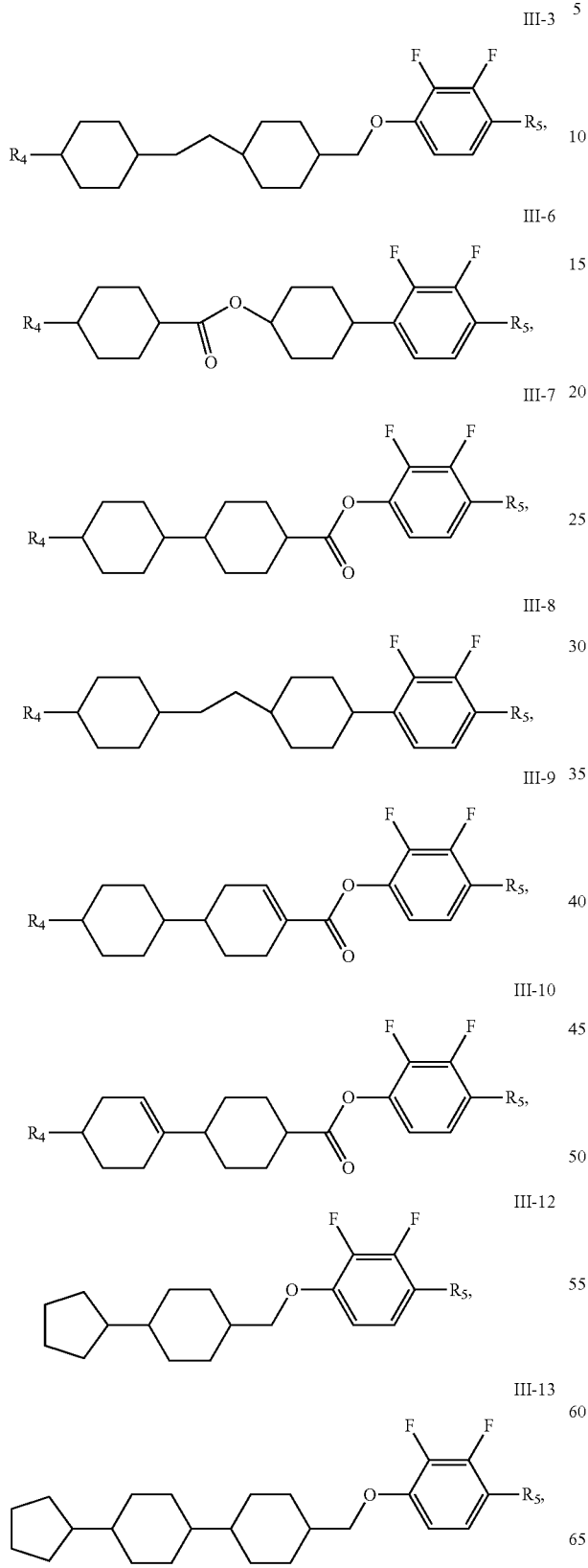

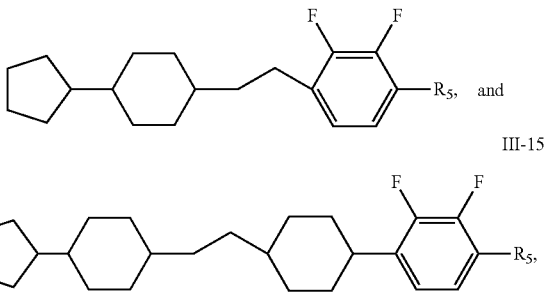

wherein, $R_1$, $R_3$ and $R_5$ each independently represents $C_{1-7}$ alkyl or alkoxy; $R_2$ and $R_4$ each independently represents $C_{1-7}$ alkyl or alkoxy, or $C_{2-7}$ alkenyl or alkenoxy; wherein one or more —H in $R_1$, $R_2$, $R_3$, $R_4$ and $R_5$ can each be independently substituted by halogen, and one or more —CH$_2$— in $R_1$, $R_2$, $R_3$, $R_4$ and $R_5$ can each be independently substituted by cyclopentyl, cyclopropyl or cyclobutyl;

$L_1$, $L_2$, $L_3$, and $L_4$ each independently represents —F, —Cl, —CF$_3$, —OCF$_3$ or —CH$_2$F.

2. The liquid crystal composition according to claim 1, wherein the compound of general Formula I is selected from a group consisting of the following compounds:

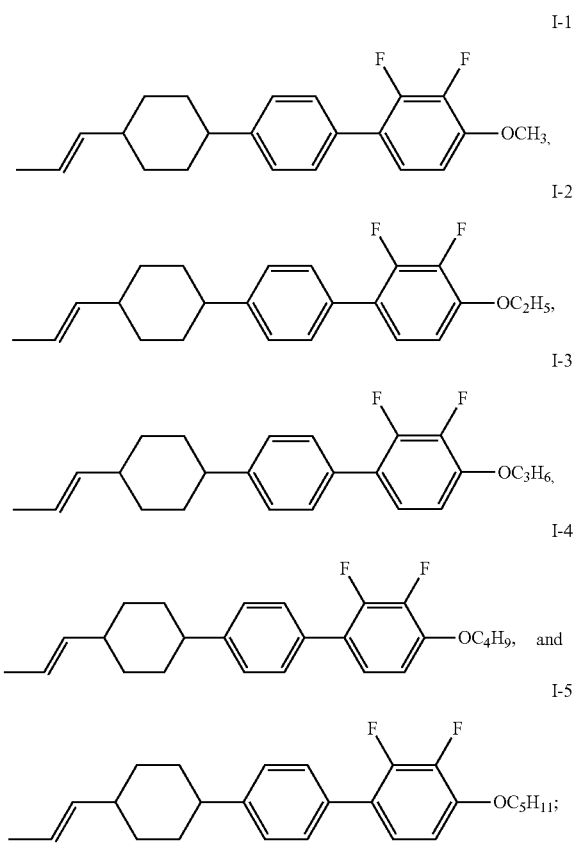

and the compound of general Formula II is selected from a group consisting of the following compounds:

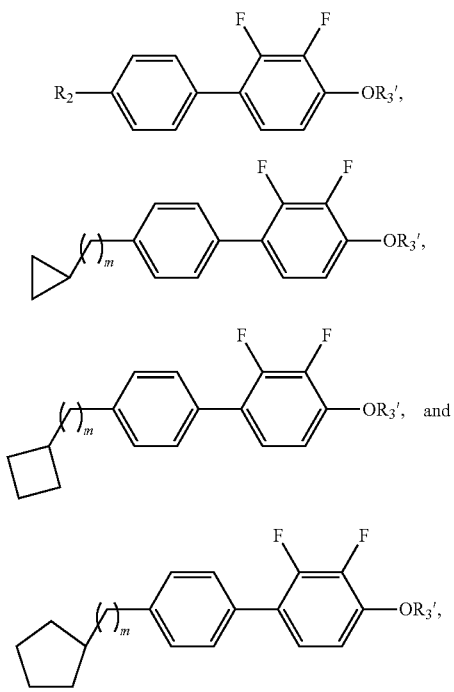

II-1

II-2

II-3

II-4

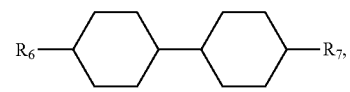

IV-1

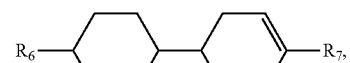

IV-2

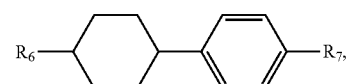

IV-3

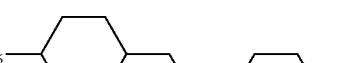

IV-4

IV-5

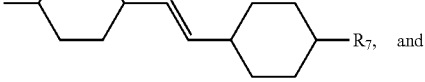

IV-6 wherein, $R_2$ represents $C_{1-7}$ alkyl or alkoxy, or $C_{2-7}$ alkenyl, $R_3'$ represents $C_{1-7}$ alkyl, and m represents 0, 1 or 2.

3. The liquid crystal composition according to claim 1, wherein the one or more compounds of general Formula I provides 10%-25% by weight of the total weight of the liquid crystal composition, the one or more compounds of general Formula II provides 8%-30% by weight of the total weight of the liquid crystal composition, and the one or more compounds of general Formula III provides 5%-30% by weight of the total weight of the liquid crystal composition.

4. The liquid crystal composition according to claim 1, further comprising:
one or more compounds of general Formula IV in an amount of 10%-70% by weight of the total weight of the liquid crystal composition

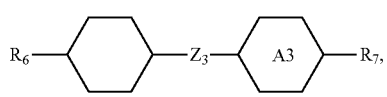

IV wherein, $R_6$ and $R_7$ each independently represents $C_{1-7}$ alkyl or alkoxy, or $C_{2-7}$ alkenyl;
$Z_3$ represents single bond, —CH$_2$CH$_2$—, —CH═CH— or —CH$_2$O—; and
ring A3 represents 1,4-cyclohexylene, 1,4-cyclohexenylene or 1,4-phenylene.

5. The liquid crystal composition according to claim 4, wherein the one or more compounds of general Formula IV provides 20%-60% by weight of the total weight of the liquid crystal composition.

6. The liquid crystal composition according to claim 5, wherein the compound of general Formula IV is selected from a group consisting of the following compounds:

7. The liquid crystal composition according to claim 1, further comprising:
one or more compounds of general Formula V in an amount of 1%-20% by weight of the total weight of the liquid crystal composition

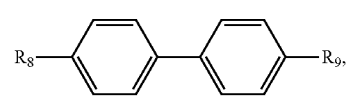

V wherein, $R_8$ and $R_9$ each independently represents $C_{1-7}$ alkyl or alkoxy, or $C_{2-7}$ alkenyl.

8. The liquid crystal composition according to claim 7, wherein at least one of $R_8$ and $R_9$ represents $C_{2-7}$ alkenyl.

9. The liquid crystal composition according to claim 8, wherein the compound of general Formula V provides 1-15% by weight of the total weight of the liquid crystal composition.

10. A photoelectric display device comprising the liquid crystal composition according to claim 1.

11. The liquid crystal composition according to claim 1, further comprising:
one or more compounds from a group consisting of the following compounds:

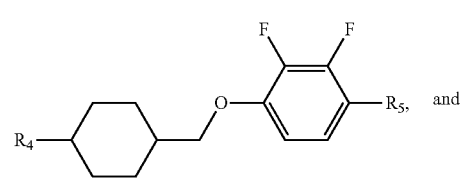

III-1

-continued
III-2
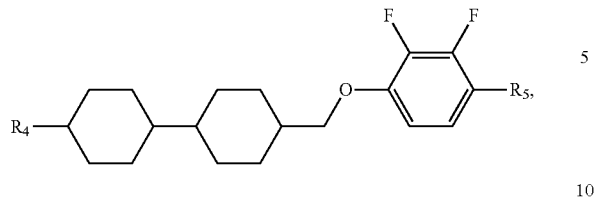
wherein: $R_4$ represents $C_{1-7}$ alkyl or alkoxy, or $C_{2-7}$ alkenyl or alkenoxy; $R_5$ represents $C_{1-7}$ alkyl or alkoxy; and
wherein one or more —H in $R_4$ and $R_5$ can each be independently substituted by halogen, and one or more —$CH_2$— in $R_4$ and $R_5$ can each be independently substituted by cyclopentyl, cyclopropyl or cyclobutyl.
* * * * *